United States Patent
Sivadas et al.

(10) Patent No.: US 7,317,757 B2
(45) Date of Patent: Jan. 8, 2008

(54) TRANSMIT AMPLITUDE INDEPENDENT ADAPTIVE EQUALIZER

(75) Inventors: Apu Sivadas, Burlington (CA); Atul Krishna Gupta, Mississauga (CA); Kenneth Steven Lazaris-Brunner, Burlington (CA); Vasilis Papanikolaou, Toronto (CA); Rajiv Kumar Shukla, Burlington (CA); Bharat Tailor, Cambridge (CA)

(73) Assignee: Gennum Corporation (CA)

( * ) Notice: Subject to any disclaimer, the term of this patent is extended or adjusted under 35 U.S.C. 154(b) by 0 days.

(21) Appl. No.: 11/187,267

(22) Filed: Jul. 22, 2005

(65) Prior Publication Data

US 2005/0254567 A1  Nov. 17, 2005

Related U.S. Application Data

(62) Division of application No. 09/957,064, filed on Sep. 19, 2001, now Pat. No. 6,956,914.

(51) Int. Cl.
*H03H 7/30* (2006.01)
(52) U.S. Cl. .................................... 375/229
(58) Field of Classification Search ............ 375/229, 375/232, 233, 234, 345, 230, 231, 236, 243, 375/254, 346, 348, 350; 330/129, 254, 278, 330/284, 304; 455/234, 1, 246.1; 370/286, 370/287, 288, 289, 290, 291; 379/414, 415, 379/416, 417
See application file for complete search history.

(56) References Cited

U.S. PATENT DOCUMENTS

| 4,590,394 | A | 5/1986 | Pace |
| 4,862,103 | A | 8/1989 | Funada |
| 5,099,366 | A | 3/1992 | Ahlgrim |
| 5,606,284 | A | 2/1997 | Tamesue et al. |
| 5,661,761 | A | 8/1997 | Iwamatsu |
| 5,761,251 | A | 6/1998 | Wender |
| 5,764,695 | A | 6/1998 | Nagaraj et al. |
| 5,777,692 | A | 7/1998 | Ghosh |
| 6,044,112 | A | 3/2000 | Koslov |

(Continued)

FOREIGN PATENT DOCUMENTS

DE  3545263  6/1987

(Continued)

OTHER PUBLICATIONS

MAXIM 3.2Gbps Adaptive Equalizer, Maxim Integrated Products, 10 pages, 1999.

(Continued)

*Primary Examiner*—Sam K. Ahn
(74) *Attorney, Agent, or Firm*—Jones Day (57) ABSTRACT

Transmit amplitude independent adaptive equalizers are provided that compensate for transmission losses in an input signal when the transmit signal amplitude is unknown. Several embodiments are provided, including a first embodiment having an equalizer core, a controllable-swing slicer and an amplitude control loop, a second embodiment having an equalizer core, a fixed-swing slicer and a control loop, a third embodiment having an equalizer core, a variable gain amplifier, and a variable gain amplifier control loop, and a fourth embodiment having an equalizer core, a fixed-swing slicer, a variable gain amplifier, and a variable gain amplifier control loop.

13 Claims, 10 Drawing Sheets

U.S. PATENT DOCUMENTS

| | | | |
|---|---|---|---|
| 6,091,942 A * | 7/2000 | Buer et al. | 455/234.1 |
| 6,169,764 B1 | 1/2001 | Babanezhad | |
| 6,266,379 B1 | 7/2001 | Dully | |
| 6,301,298 B1 * | 10/2001 | Kuntz et al. | 375/232 |
| 6,304,615 B1 | 10/2001 | Webster | |
| 6,415,003 B1 | 7/2002 | Raghavan | |
| 6,438,163 B1 | 8/2002 | Raghavan et al. | |
| 6,597,898 B1 * | 7/2003 | Iwata et al. | 455/240.1 |
| 6,621,343 B2 * | 9/2003 | Hart | 330/254 |
| 6,691,260 B1 | 2/2004 | Ueno | |
| 6,717,986 B1 | 4/2004 | Ueno | |
| 6,859,641 B2 * | 2/2005 | Collins et al. | 455/63.1 |
| 2002/0154054 A1 * | 10/2002 | Small | 342/201 |
| 2002/0197958 A1 * | 12/2002 | Collins et al. | 455/63 |

FOREIGN PATENT DOCUMENTS

| | | |
|---|---|---|
| EP | 0073400 | 3/1983 |
| EP | 0437945 | 7/1991 |
| EP | 0611059 | 8/1994 |
| FR | 2665808 | 2/1992 |
| WO | WO 98 45955 | 10/1998 |

OTHER PUBLICATIONS

A.J. Baker, "An Adaptive Cable Equalizer for Serial Digital Video Rates to 400 Mb/S," IEEE ISSCC, 2 pages, 1996.

M.H. Shakiba, "A 2.5 Gb/s Adaptive Cable Equalizer", IEEE ISSCC, 10 pages, 1999.

* cited by examiner

TRANSMIT AMPLITUDE INDEPENDENT ADAPTIVE EQUALIZER

This Application is a Divisional Application of application Ser. No. 09/957,064, filed on Sep. 19, 2001, now U.S. Pat. No. 6,956,914, the entire disclosure of which is incorporated herein by reference.

This Application is also related to co-pending application Ser. Nos. 11/187,265 and 11/187,266, filed on Jul. 22, 2005, which are Divisional Applications of application Ser. No. 09/957,064, the disclosures of which are incorporated herein by reference.

BACKGROUND

1. Field of the Invention

This invention relates generally to the field of equalizers. More particularly, the invention provides a transmit amplitude independent adaptive equalizer that is capable of compensating for transmission losses in an input signal when the transmit signal amplitude is unknown. The invention is particularly well suited for use in digital communication components, such as receivers, equalizers, high-speed backplanes, Printed Circuit Board Trace equalizers, automatic gain control devices, and other types of digital communication components.

2. Description of the Related Art

Figure 1:
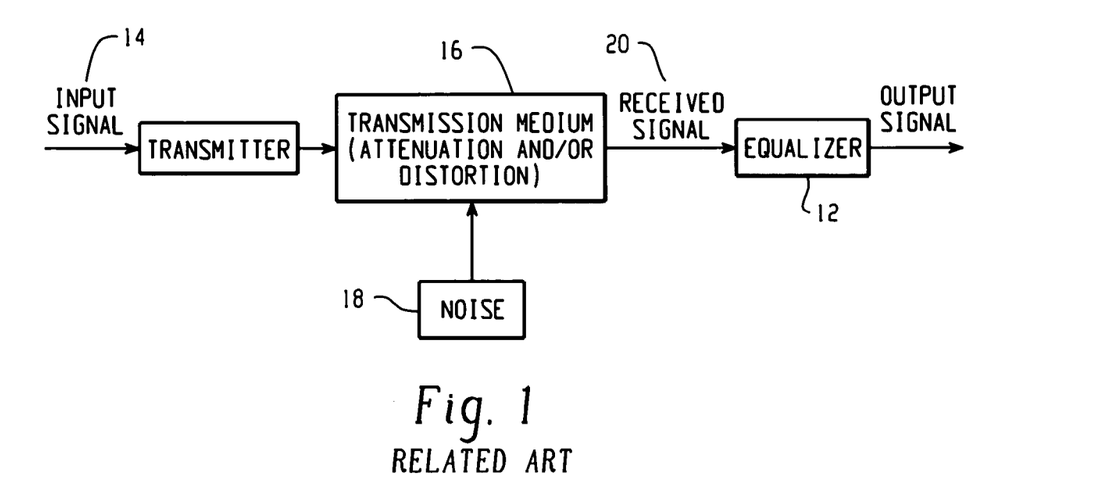
FIG. 1 is a block diagram showing the use of an equalizer in a typical serial digital data communication system in which an input signal is transmitted through a transmission medium.

The use of an equalizer to compensate for loss resulting from the non-idealities of a transmission medium is known. FIG. 1 is a block diagram showing an equalizer 12 implemented in a typical digital communications system 10 in which an input signal 14 is transmitted through a transmission medium 16. Typical transmission media 16 used for transmission of digital signals over relatively short distances include, for example, printed circuit board (PCB) traces and coaxial cables. These, and other known transmission media, typically cause significant frequency dependant losses in digital signals being transmitted over the media and consequently distort the digital data, often resulting in pulse spreading and interference between neighboring pulses (known as intersymbol interference). In addition, the input signal 14 is further corrupted during transmission by noise 18 induced by the transmission medium 16. The equalizer 12 regenerates the transmitted signal 20 by providing gain to compensate for the frequency dependant losses caused by the transmission medium 16 (up to some maximum length) while preferably minimizing the effect of noise 18. This function is typically achieved by applying a transfer function to the received signal 20 that approximates the inverse of the transmission losses.

Figure 2:
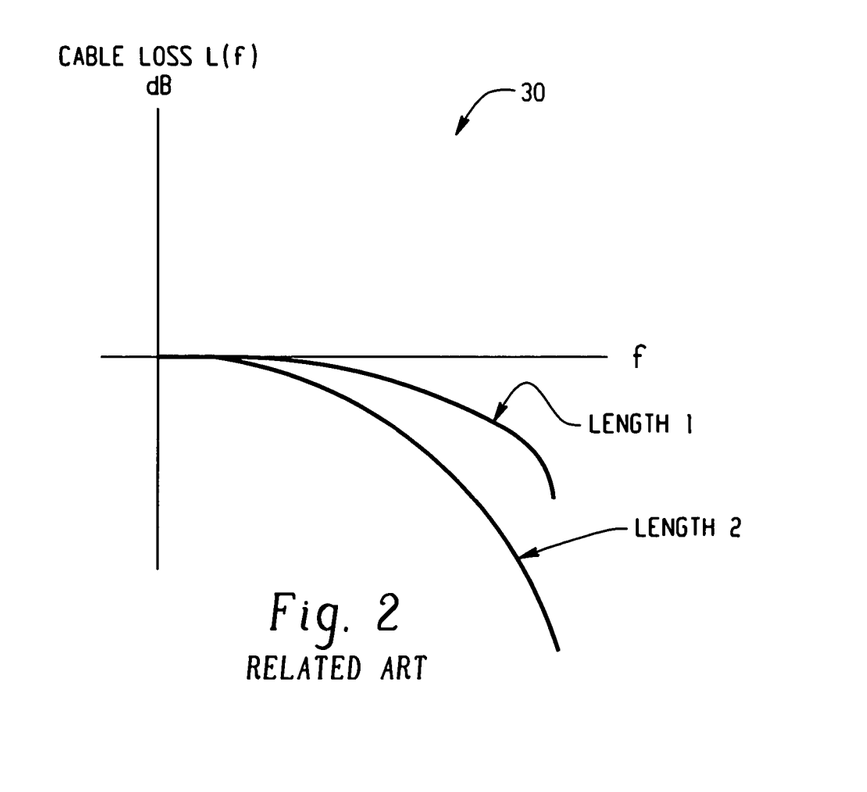
FIG. 2 is a graph showing the loss (in dB) incurred in the transmission medium, plotted as a function of both the length (l) of the medium and the frequency (f) of the signal.

FIG. 2 is a graph 30 showing the loss (in dB) incurred in the transmission medium 16, plotted as a function of both the length (l) of the medium 16 and the frequency (f) of the signal. Generally, the loss over a transmission medium (such as a coaxial cable or PCB trace) may be approximated in the frequency domain by the following equation:

$$L(f) = e^{-l(k_s\sqrt{jf} + k_d jf)};$$

where f is the frequency, l is the length of the transmission medium, $j = \sqrt{-1}$, $k_s$ is the skin effect loss constant of the transmission medium, and $k_d$ is the dielectric loss constant of the transmission medium. The value of L(f) is plotted in FIG. 2 for transmission media of two different lengths: Length 1 (shorter) and Length 2 (longer). As the length (l) of the transmission medium increases, the loss increases. In addition, as the frequency (f) increases, the loss increases.

To counteract the transmission loss shown in FIG. 2, an equalizer 12 should have a frequency characteristic that is the inverse of the loss function of the transmission medium. The inverse loss function may be approximated as follows:

$$\frac{1}{L(f)} = G(f) = 1 + KH(f);$$

where K is a control variable that is proportional to the length (l) of the transmission medium. The value of K typically varies from zero to unity (or some other constant) as the transmission medium approaches its maximum length.

Figure 3:
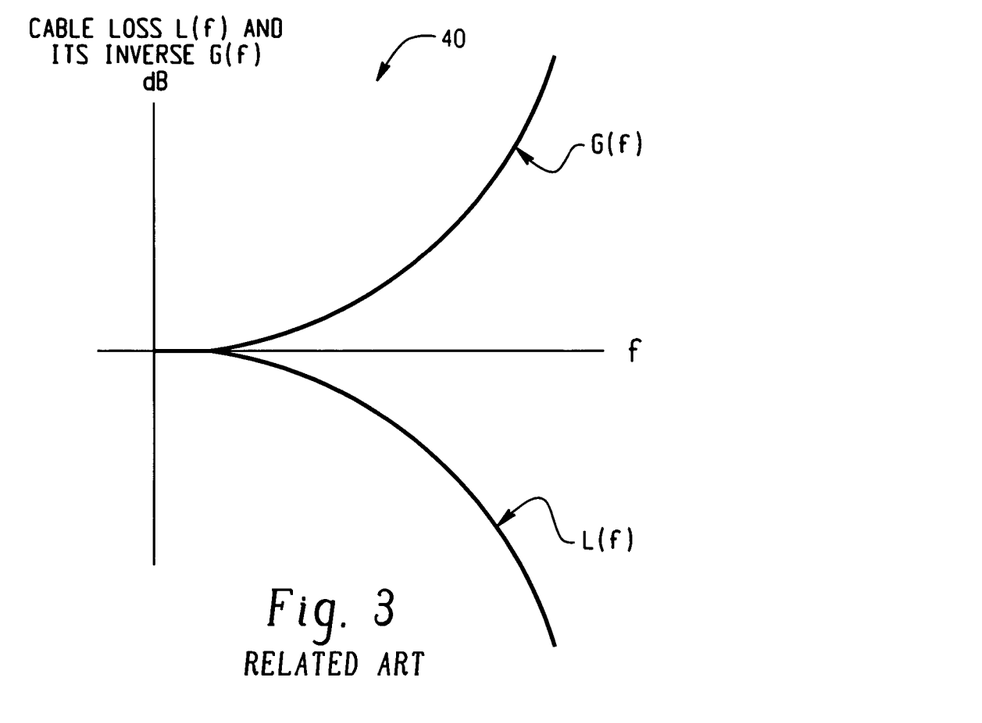
FIG. 3 is a graph showing the inverse loss function G(f) plotted on the same axes as the loss function L(f)

FIG. 3 is a graph 40 showing the inverse loss function G(f), plotted in dB on the same axes as the loss function L(f). As shown in this figure, the inverse loss function G(f) provides a frequency dependant gain equivalent to the loss L(f) incurred in the transmission medium. The characteristics of the inverse loss function G(f) are explained in more detail in U.S. patent application Ser. No. 09/055,515 (hereinafter referred to as "the '515 Application") which is owned by the Assignee of the present application, and which is hereby incorporated into the present application by reference.

Figure 4:
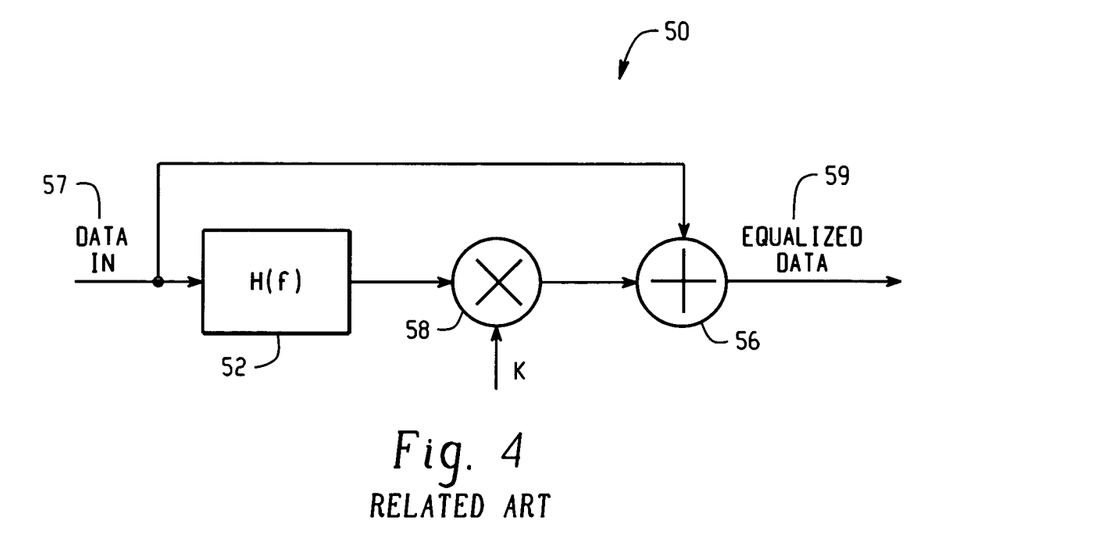
FIG. 4 is a block diagram of an equalizer core that implements the inverse loss function G(f)

FIG. 4 is a block diagram of an equalizer core 50 that implements the inverse loss function G(f). The equalizer core 50 includes a transfer function block 52 (H(f)), a multiplier 58, and an adder 56. This circuit 50 applies variable gain to an input signal 57 by applying the transfer function H(f) in order to generate a resultant signal and then by multiplying the resultant signal from the transfer function block 52 by a gain control signal 58 (K). The gain control signal 58 (K) preferably controls the amount of gain applied by the transfer function H(f) by multiplying the output of the transfer function block 52 by a factor typically varying from zero (0) to unity (1) depending upon the length (l) of the transmission medium 16. For instance, when the transmission medium 16 is at a maximum length, the transfer function H(f) is generally multiplied by unity (1) to provide the maximum gain. The output of the multiplier is then summed with the input signal 57 by the adder 56 in order to produce an equalized output signal 59 corresponding to the inverse loss function (1+KH(f)). An exemplary circuit for implementing the transfer function block 52 is described in the above-referenced '515 Application.

Figure 5:
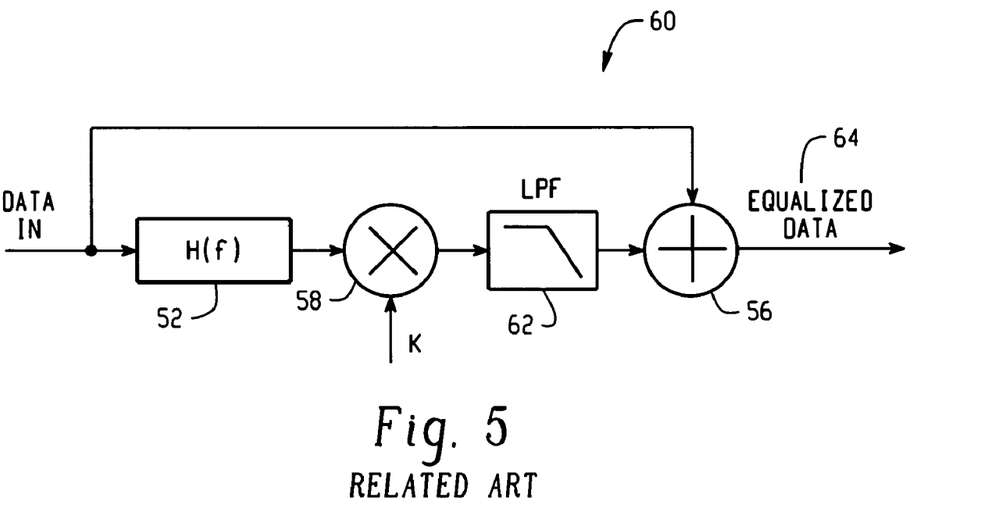
FIG. 5 is a block diagram of an alternative equalizer core that implements a bandwidth-limited inverse loss function.
Figure 6:
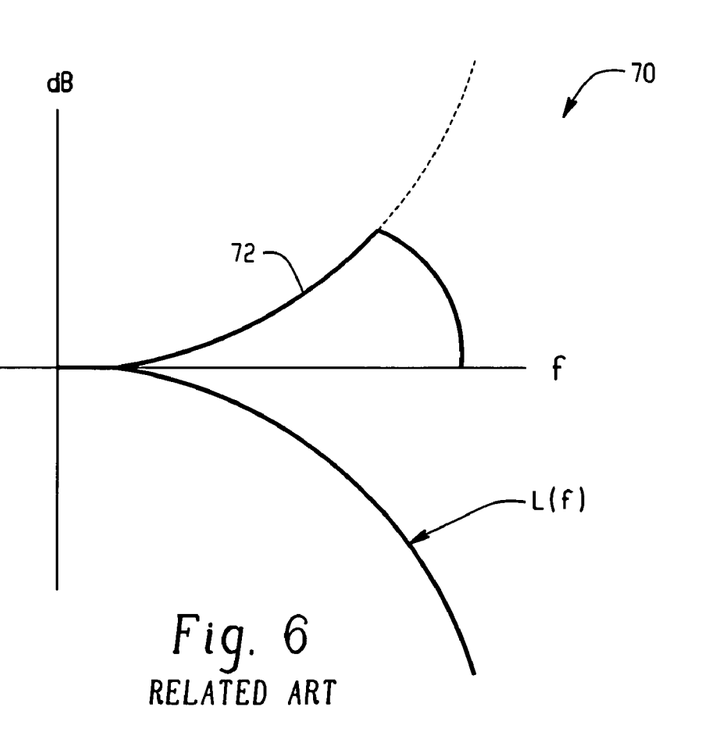
FIG. 6 is a graphical representation of the bandwidth-limited inverse loss function, plotted on the same axes as the loss function L(f)

FIG. 5 is a block diagram of an alternative equalizer core 60 that implements a bandwidth-limited inverse loss function. In this circuit 60, a low-pass filter 62 is added to the equalizer core 50 shown in FIG. 4 to reduce noise encountered in the transmission medium 16. This alternative implementation 60 reduces the amplification of high frequency noise, and thus increases the signal-to-noise ratio (SNR) of the equalized output signal 64. A graphical representation 70 of the bandwidth-limited inverse loss function 72, plotted on the same axes as the loss function L(f) is shown in FIG. 6.

Figure 7:
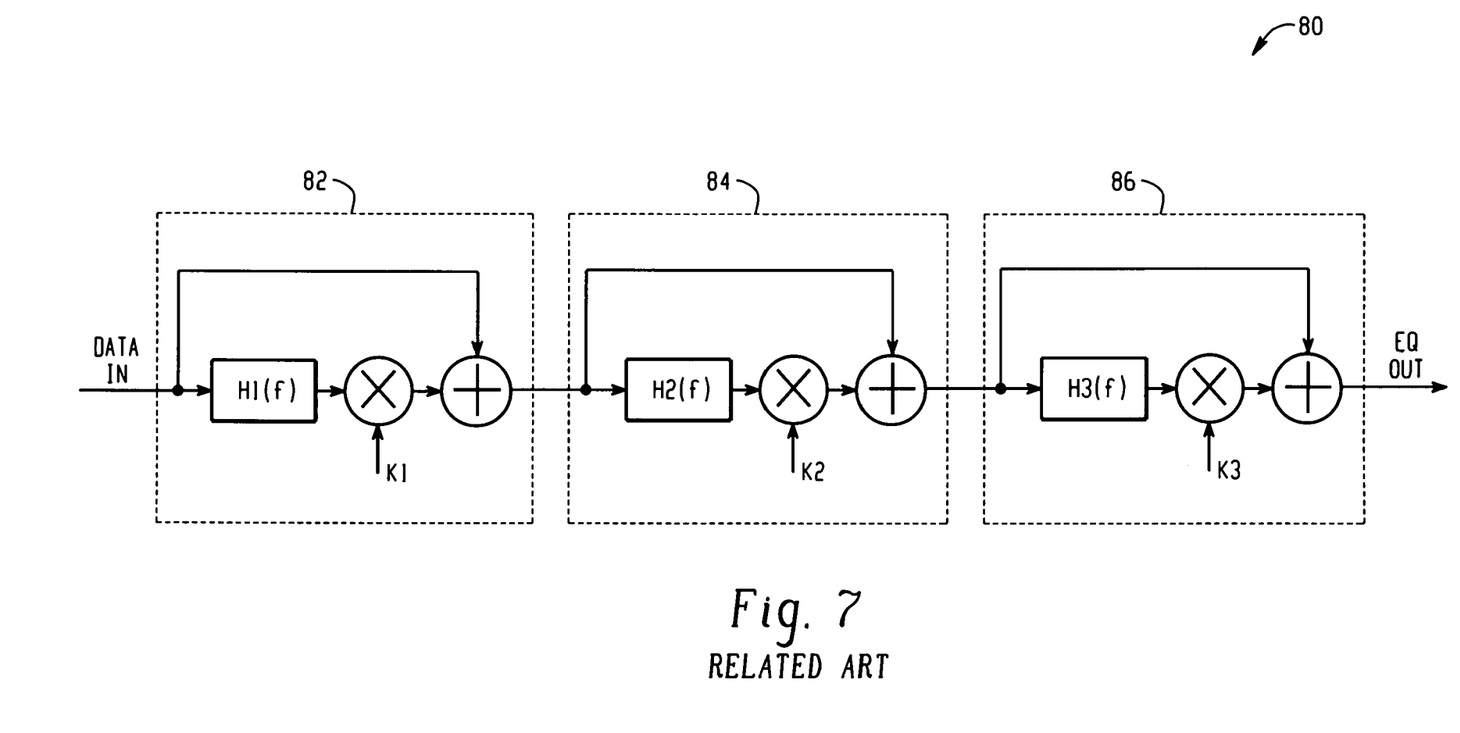
FIG. 7 is a block diagram showing a known multiple-stage equalizer core in which each stage implements the inverse loss function G(f)

FIG. 7 is a block diagram showing a multiple-stage equalizer core 80 having three equalizer stages 82, 84 and 86, each of which implements the inverse loss function G(f). The three cascaded equalizer stages 82, 84 and 86 are preferably the same as the equalizer core 50 shown in FIG. 4. Alternatively, the multiple-stage equalizer core 80 could include a plurality of bandwidth-limited stages as shown in FIG. 5, or other types of cores. In any case, each equalizer stage 82, 84 and 86 includes a gain control signal (K1, K2 or K3) that is used to control the gain implemented by the transfer function H(f) in proportion to the length of the transmission medium 16. The advantages of utilizing a multiple-stage equalizer core are explained in detail in the '515 Application.

Operationally, each stage 82, 84 and 86 in the multiple-stage equalizer core 80 is configured to equalize signals transmitted over transmission media up to a percentage of the total maximum transmission medium length. For instance, if the multiple-stage equalizer core 80 is capable of equalizing losses incurred in a printed circuit board ("PCB") trace of up to 30 inches, then each core stage 82, 84, and 86 will typically be configured to equalize losses in PCB traces of up to 10 inches. The stages 82, 84 and 86 are then cascaded such that they operate sequentially to equalize PCB traces of up to 30 inches.

Figure 8:
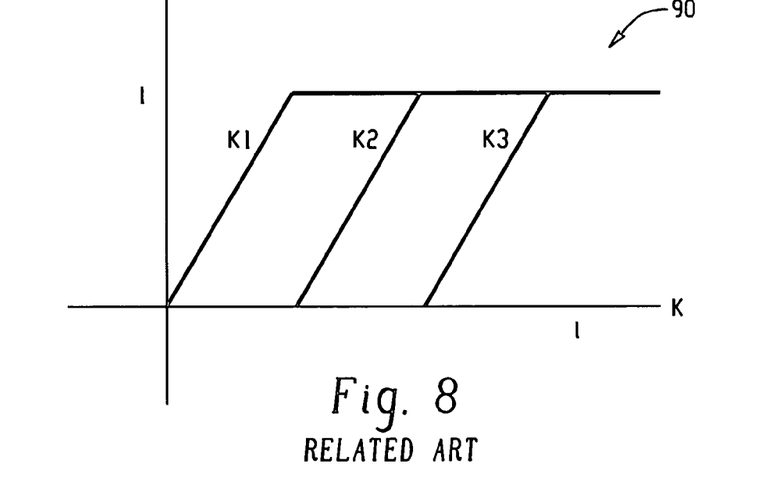
FIG. 8 is a graph showing how the gain control signals in the multiple-stage equalizer core are adjusted according to the length of the transmission medium.

FIG. 8 is a graph 90 showing how the gain control signals K1, K2 and K3 in the multiple-stage equalizer core 80 are varied according to the length of the transmission medium. The value K, shown along the x-axis in FIG. 8, represents the percentage of the transfer function H(f) that needs to be applied to an input signal in order to supply the gain necessary to equalize a transmission medium of a given length. As the transmission medium length increases, the gain necessary to equalize the transmission losses in the medium also increases. FIG. 8 shows that the gain control signals K1, K2 and K3 cause gain to be supplied sequentially by the equalizer stages 82, 84 and 86. For instance, if each equalizer stage 82, 84 and 86 is capable of providing the necessary gain to equalize 10 inches of a PCB trace, then the gain control signal K1 would typically control the gain necessary for PCB traces from 0 to 10 inches, the combined gain control signals K1 (at unity) and K2 would typically control the gain necessary for PCB traces from 10 to 20 inches, and the combined gain control signals K1 (at unity), K2 (at unity) and K3 would typically provide the gain for PCB traces from 20 to 30 inches. For example, if the PCB trace were 15 inches in length and each equalizer stage 82, 84 and 86 can equalize 10 inches, then K1 would be at its maximum value (unity), K2 would be at the value necessary to cause the second equalizer stage 84 to equalize a 5 inch transmission medium, and K3 would be zero.

Figure 9:
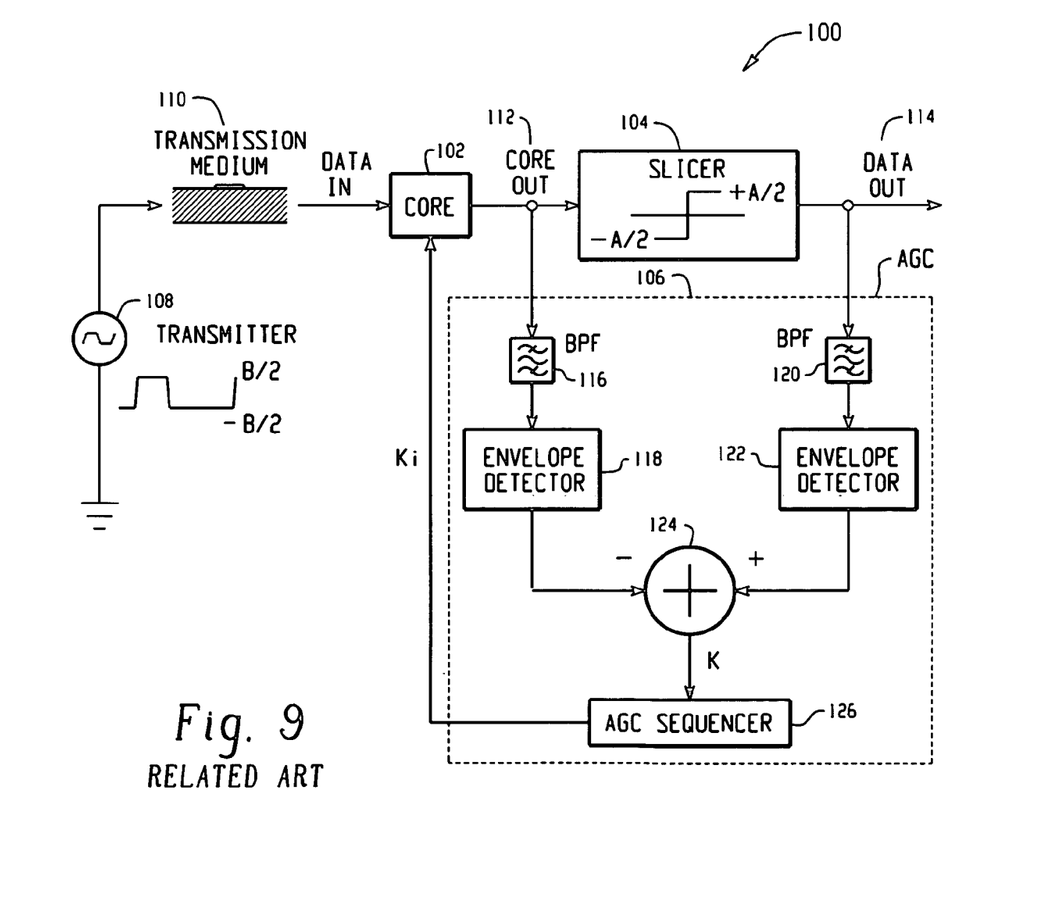
FIG. 9 is a block diagram showing an exemplary equalizer system such as described in the referenced '515 Application.

FIG. 9 is a block diagram showing an exemplary equalizer system 100 such as described in the referenced '515 Application. This equalizer system 100 includes an equalizer core 102, a slicer 104, an automatic gain control circuit (AGC) 106, a transmitter 108, and a transmission medium 110. The equalizer core 102 may be either a single-stage core as shown in FIG. 4 or 5 or a multiple-stage core as shown in FIG. 7, and operates, as described above, to compensate for the losses incurred in the transmission medium 110. The output 112 of the equalizer core 102 is coupled to the slicer 104, which converts the output signal 112 from the core 102 to a digital output signal 114 having a known swing (A) that approximates the swing (B) of the data sent from the transmitter 108. Since the swing (B) of the transmitted data is known and reproduced as the swing (A) of the digital output signal 114 from the slicer 104, the difference in energy between the equalizer core output signal 112 and the digital output signal 114 approximates the energy lost in the transmission medium 110, which is proportional to its length. The AGC 106 compares the energy of the equalizer core output signal 112 with the energy of the digital output signal 114 from the slicer 104 to generate the gain control signal K.

The AGC 106 includes a core-side band-pass filter 116, a core-side envelope detector 118, a slicer-side band-pass filter 120, a slicer-side envelope detector 122, an adder 124, and a sequencer 126. Operationally, the AGC 106 filters the core and digital outputs 112 and 114 to mid-band frequencies using the band-pass filters 116 and 120. The advantage of filtering the core and digital outputs 112 and 114 to their mid-band frequencies is explained in detail in the '515 Application. Following this filtering function, the AGC 106 then detects the signal energy of the two band-limited signals with the envelope detectors 118 and 122. Finally, it determines the difference between the two signal energies with the adder 124, which provides the gain control signal K. If the equalizer core 102 is single-stage, then the gain control signal K is typically coupled directly to the core 102 to control the variable gain as described above. If, however, the equalizer core 102 is of the multiple-stage type, then the sequencer 126 is used to convert the gain control signal K from the adder 124 into a plurality of multiple-stage gain control signals Ki, such as K1, K2 and K3 described above with reference to FIGS. 7 and 8. In either case, the gain control signal(s) K (or Ki) enable the equalizer core 102 to equalize the core output signal 112 by forcing it to the same energy level as the digital output signal 114 from the slicer 104. A further description of the AGC 106 is provided in the above referenced '515 Application.

One skilled in the art will appreciate that the signal swing (B) at the transmitter 108 must be known a priori and accurately replicated by the slicer 104 if the equalizer system 100 shown in FIG. 9 is to achieve optimal performance. Any significant difference between the signal swing (B) at the transmitter 108 and the signal swing (A) of the digital output signal 114 will directly result in a gain (equalization) error. For example, an increase in the swing (B) of the transmitted signal will force the AGC loop 106 to settle at a lower gain than necessary to compensate for the transmission loss (under-equalization). Similarly, a decrease in the swing (B) of the transmitted signal will result in over-equalization. Even if the swing (B) of the transmitted signal were tightly controlled, similar equalization errors may be caused by mismatch in the digital output swing (A) generated by the slicer 104. Such mismatch errors may be caused, for example, by variations in temperature, power supply voltages, or manufacturing processes.

SUMMARY

A transmit amplitude independent adaptive equalizer is provided. One embodiment of the equalizer comprises an equalizer core, a controllable-swing slicer and an amplitude control loop. The equalizer core is coupled to an input signal from a transmission medium, and generates a core output signal by applying a frequency dependant gain to the input signal to compensate for losses incurred in the transmission medium. The controllable-swing slicer is coupled to the core output signal and a swing control input, and converts the core output signal into a digital output signal having a variable swing that is controlled by the swing control input. The amplitude control loop is coupled to the core output signal and the digital output signal, and generates the swing control input by comparing the core output signal with the digital output signal.

A second embodiment of the equalizer comprises an equalizer core, a fixed-swing slicer, and a control loop. The equalizer core is coupled to an input signal from a transmission medium and a gain control input, and generates a core output signal by applying a frequency dependant gain to the input signal. The frequency dependant gain is controlled by the gain control input and compensates for losses incurred in the transmission medium. The fixed-swing slicer is coupled to the core output signal and converts the core output signal to a digital output signal having a fixed digital output swing. The control loop is coupled to the core output signal and the digital output signal and normalizes the core and digital output signals with respect to their low-frequency energy levels, compares the normalized core output signal with the normalized digital output signal to approximate a normalized energy level difference, and generates the gain control input.

A third embodiment of the equalizer comprises a variable gain amplifier, a variable gain amplifier control loop, and an equalizer core. The variable gain amplifier is coupled to an input signal from a transmission medium and a variable gain control signal, and applies a variable gain to the input signal to generate an equalizer core input signal having a pre-determined signal swing. The variable gain amplifier control loop is coupled to the input signal and the equalizer core input signal, and compares the input signal with the equalizer core input signal in order to generate the variable gain control signal. The equalizer core is coupled to the equalizer core input signal, and applies a frequency dependant gain to the amplifier output in order to compensate for attenuation of the input signal caused by losses incurred in the transmission medium.

A fourth embodiment of the equalizer comprises a variable gain amplifier, an equalizer core, a fixed-swing slicer and a variable gain amplifier control loop. The variable gain amplifier is coupled to an input signal from a transmission medium and is also coupled to a variable gain control signal. The variable gain amplifier applies a variable gain to the input signal in order to generate an equalizer core input signal having a pre-determined signal swing. The equalizer core is coupled to the equalizer core input signal, and applies a frequency dependant gain to the amplifier output in order to compensate for attenuation of the input signal that is caused by losses incurred in the transmission medium and generates a core output signal. The fixed-swing slicer is coupled to the core output signal, and converts the core output signal into a digital output signal having the pre-determined signal swing. The variable gain amplifier control loop is coupled to the core output signal and the digital output signal, and compares the core output signal with the digital output signal in order to generate the variable gain control signal.

DETAILED DESCRIPTION

Figure 10:
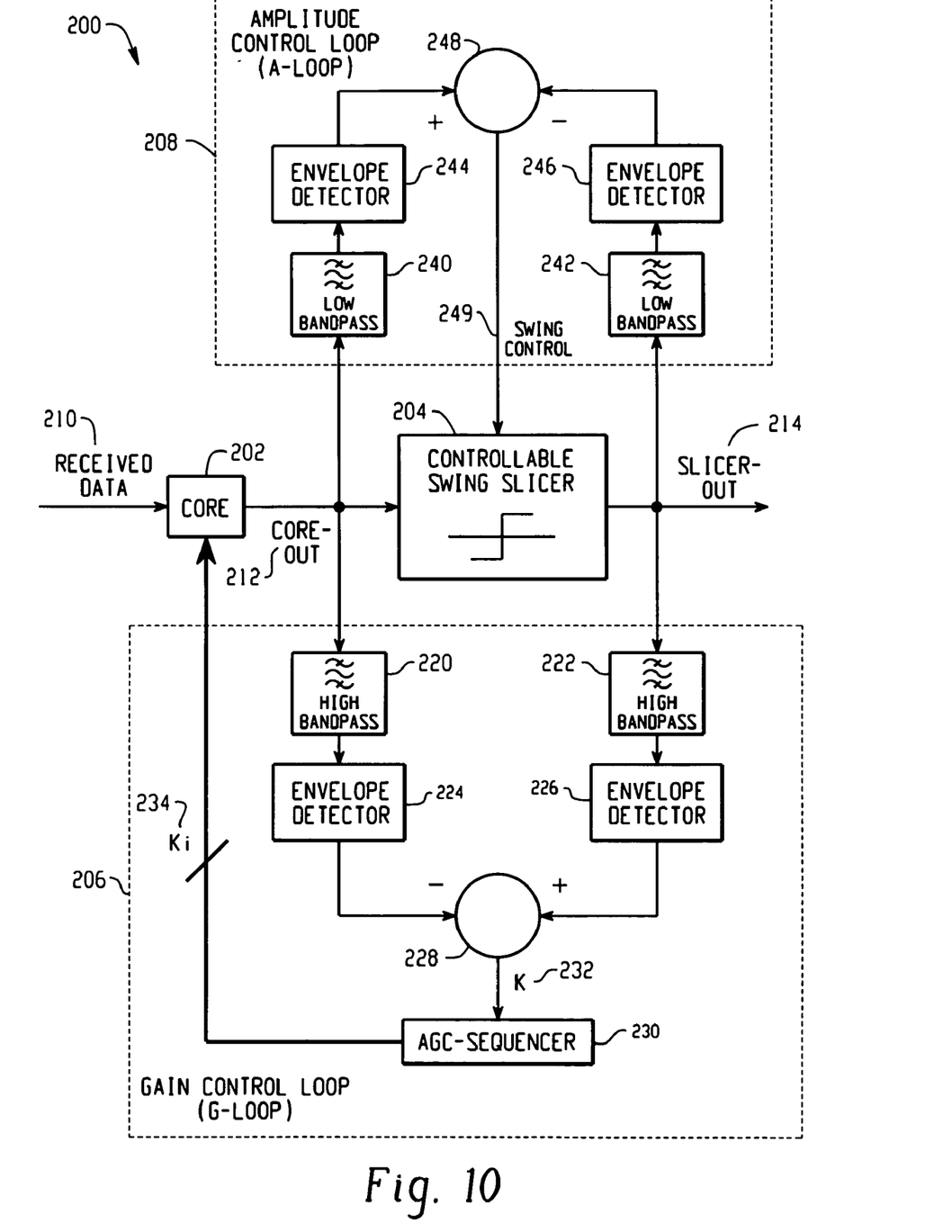
FIG. 10 is a block diagram of an exemplary transmit amplitude independent adaptive equalizer having a controllable-swing slicer according to one embodiment of the claimed invention.

Referring again to the drawing figures, FIG. 10 is a block diagram of an exemplary transmit amplitude independent adaptive equalizer 200 having a controllable-swing slicer 204. The equalizer 200 includes an equalizer core 202, a controllable-swing slicer 204, a gain control loop (G-Loop) 206, and an amplitude control loop (A-Loop) 208. The G-Loop 206 includes two high band-pass filters 220 and 222, two envelope detectors 224 and 226, an adder 228, and a sequencer 230. The amplitude control loop (A-Loop) 208 includes two low band-pass filters 240 and 242, two envelope detectors 244 and 246, and an adder 248.

Operationally, the amplitude independent adaptive equalizer 200 tracks the amplitude at which its input signal 210 was transmitted by varying the swing of its digital output signal 214 to approximate the swing of the transmitted data. Because the loss incurred in a transmission medium is frequency dependant, the low frequency portion of the equalizer's input signal 210 shows substantially less attenuation than the higher frequency portions. The equalizer 200 thus detects the amplitude of its input signal 210 at a low frequency, and uses this low-frequency amplitude to approximate the swing of the transmitted data.

The equalizer core 202 receives the input signal 210 from a transmission medium and generates a core output signal 212. The input signal 210 is preferably a digital signal that has been attenuated during transmission over a transmission medium. The equalizer core 202 compensates for attenuation and distortion in the input signal 210 by applying an inverse loss function G(f) as described above with reference to FIGS. 2-8. The equalizer core 202 also receives a gain control signal (Ki) 234 from the gain control loop (G-Loop) 206, which controls the gain applied by the inverse loss function G(f). The core output signal 212 is then coupled to the controllable-swing slicer 204, which converts the core output signal 212 into a digital output signal 214 having a swing that is controlled by the amplitude control loop (A-Loop) 208. The A-Loop 208 isolates the low frequency portions of the core output signal 212 and the digital output signal 214, and compares the signal energies of the two low band-limited signals to set the controllable-swing slicer 204 to approximate the swing of the equalizer input 210 prior to transmission. Similarly, the high frequency portions of the core output signal 212 and the digital output signal 214 are isolated by the gain control loop (G-Loop) 206, which compares the signal energies of the high band-limited signals to generate the gain control signal (Ki) 226. Preferably, the low band-limited signals are centered towards the low end of the transmit spectrum at which the transmission losses are minimal, and the high band-limited signals are centered towards the higher end of the transmit spectrum at which the transmission losses are more significant. However, the low and high band-limited signals may be centered at alternative points within the transmit spectrum as long as the A-Loop 208 isolates a lower spectral range than the G-Loop 206.

Within the A-Loop 208, the low frequency portions of the core output signal 212 and the digital output signal 214 are isolated by the low band-pass filters 240 and 242. The low band-limited signals are each coupled to one of the envelope detectors 244 and 246, which detect the signal energies. The envelope detectors 244 and 246 may preferably be comprised of rectifiers, but could alternatively be any device or combination of devices capable of generating an output signal proportional to the signal energy of its input. The difference between the energy-level outputs from the envelope detectors 244 and 246 is then determined by the adder 248. Preferably, the energy difference is calculated by coupling the energy-level output from one envelope detector 244 as a positive input to the adder 248, and the energy-level output from the other envelope detector 246 as a negative input to the adder 248. In this manner, the adder 248 generates a swing control signal 249 that is proportional to the energy difference between the low band-limited signals. The swing control signal 249 is coupled to the controllable-swing slicer 204 to control the energy level of the digital output signal 214. Operationally, the A-Loop swing control signal 250 forces the swing of the digital output 214 to match the swing of the low band-limited core output. Because the low band-limited core output is typically not significantly attenuated by the transmission medium, the swing of the digital output 214 is thus made to approximate the swing of the equalizer input 210 prior to transmission.

Within the G-Loop 206, the higher frequency portions of the core output signal 212 and the digital output signal 214 are isolated by the high band-pass filters 220 and 222. The bandwidths of the high band-pass filters 220 and 222 are preferably set to isolate the frequency band in which the equalizer input signal 210 is most significantly effected by transmission losses. Once the core and digital outputs 212 and 214 have been band-limited by the high band-pass filters 220 and 222, the signals are respectively coupled to the input of the envelope detectors 224 and 226, each of which generates an energy-level output proportional to the signal energy of its input signal. The difference between the energy-level outputs of the envelope detectors 224 and 226 is preferably determined by coupling one energy-level output as a negative input to the adder 228 and coupling the other energy-level output as a positive input to the adder 228. The adder 216 then generates a single-stage gain control signal (K) 232 that is proportional to the energy difference between the band-limited core and digital output signals. Because this energy difference approximates the energy lost during transmission over the transmission medium, the single-stage gain control signal (K) 232 settles to a value proportional to the transmission loss which is a function of the length of the transmission medium. The single-stage gain control signal (K) 232 is coupled to the sequencer 230, which generates the gain control signal Ki 234 that is fed back to control the gain of the equalizer core 202 as described above with reference to FIGS. 7 and 8. Alternatively, if the equalizer core 202 is a single-stage equalizer core as described above with reference to FIG. 4 or FIG. 5, then the single-stage gain control signal (K) 232 may be directly fed back to the equalizer core 202.

It should be understood that many types of controllers could be used to implement the A-Loop 208 and the G-Loop 206 shown in FIG. 10. For instance, the A-Loop 208 and the G-Loop 206 may be implemented as either a proportional type controller (P-Type), an integral type controller (I-Type) or a combination PI-type controller. To implement the G-Loop 206 as an I-Type controller, for example, an integrator ($K_I/s$) could be coupled between the adder 228 and the sequencer 230. In addition, to maintain stability in the system, the A-Loop 208 and the G-Loop 206 are preferably implemented as different controller types such that one control loop 206 or 208 has a dominant time constant/pole. For example, the G-Loop 206 may preferably be implemented as a slower I-type loop, while the A-Loop 208 is implemented as a faster P-Type loop.

Figure 11:
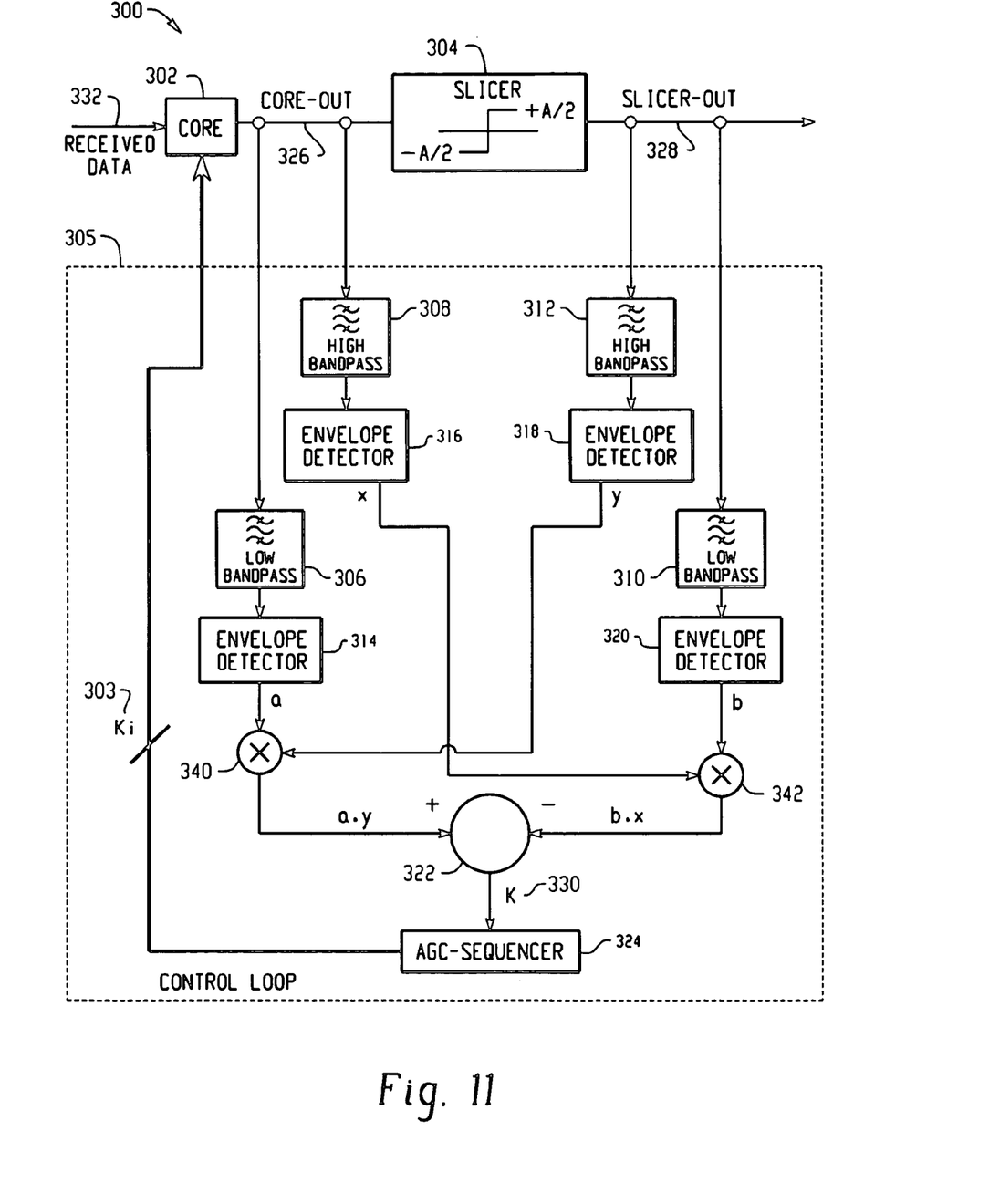
FIG. 11 is a block diagram of an exemplary transmit amplitude independent adaptive equalizer having a fixed-swing slicer according to another embodiment of the claimed invention.

FIG. 11 is a block diagram of an exemplary transmit amplitude independent adaptive equalizer 300 having a fixed-swing slicer 304. In this exemplary embodiment, the amplitude independent adaptive equalizer 300 includes an equalizer core 302, a slicer 304, and a control loop 305. The control loop includes a core-side low band-pass filter 306, a core-side high band-pass filter 308, a slicer-side low band-pass filter 310, a slicer-side high band-pass filter 312, four envelope detectors 314, 316, 318 and 320, a core-side multiplier 340, a slicer-side multiplier 342, an adder 322, and a sequencer 324. Operationally, the equalizer 300 utilizes a fixed-swing slicer 304, which is independent from the amplitude of the equalizer's input signal 332. To accomplish amplitude independence and maintain optimal equalization, the equalizer 300 calculates the necessary gain by first normalizing the energy level at the outputs of the equalizer core 302 and the fixed-swing slicer 304 with respect to their low-frequency amplitudes, and then comparing the normalized signals.

The equalizer core 302 receives an input signal 332 from a transmission medium and a gain control signal (Ki) 303 from the control loop 305. As described above, the equalizer core 302 applies a frequency dependant gain to the equalizer input signal 332 as a function of the gain control signal (Ki), and generates a core output signal 326. The core output signal 326 is then coupled to the fixed-swing slicer 304, which converts the core output signal 326 into a digital output signal 328 having a fixed swing. Preferably, the swing (A) of the digital output signal is fixed at a nominal value at which data is most often transmitted to the equalizer 300. Because the equalizer 300 is independent of the amplitude of the input signal 332, however, the swing (A) of the digital slicer output 328 may not approximate the swing of the equalizer input signal 332 prior to transmission. Therefore, to accurately determine the losses incurred in the transmission medium and achieve optimal equalization, the control loop 305 sets the gain control signal (Ki) by normalizing the energy level of the core and digital output signals 328 and 326 with respect to their respective low-frequency amplitudes before comparing the signals to determine the necessary gain to be implemented by the core 302. The control loop 305 may be implemented, for example, as either a proportional type controller (P-Type), an integral type controller (I-Type) or a combination PI-type controller.

Within the control loop 305, the low frequency portions of the core output signal 326 and the digital output signal 328 are isolated by the core-side low band-pass filter 306 and the slicer-side low band-pass filter 310, respectively. The center frequency of the low band-pass filters 306 and 310 is preferably chosen to match the frequency band at which the equalizer input signal 332 exhibits minimal attenuation. Similarly, the higher frequency portions of the core output signal 326 and the digital output signal 328 are isolated by the core-side high band-pass filter 308 and the slicer-side high band-pass filter 312, respectively. The bandwidths of the high band-pass filters 308 and 312 are preferably chosen to isolate the frequency band at which the equalizer input signal 332 is attenuated and distorted by the transmission medium. The energy level of the output of each band-pass filter 306, 308, 310 and 312 is then determined by one of the envelope detectors 314, 316, 320 and 318, each of which generates an energy-level signal (a, x, b, and y) proportional to the energy of its input.

In amplitude dependant equalizer systems, such as described above with reference to FIG. 9, the energy level signals (x and y) for the high frequency portion of the core and slicer outputs 326 and 328 are compared to force the energy level of the core output equal to the known energy level of the slicer output (x=y). This relationship between the energy-level signals (x and y) loses its significance, however, when the swing (A) generated by the slicer 304 is not substantially equal to the swing of the data prior to transmission. Thus, to compensate for an unknown input signal amplitude, the energy-level signal (y) of the high frequency portion of the digital output signal 328 is weighted with the energy-level signal (a) of the low frequency portion of the core output signal 326. Similarly, the energy-level signal (x) of the high frequency portion of the core output signal 326 is weighted with the energy-level signal (b) of the low frequency portion of the digital output signal 328. With reference to FIG. 11, the core-side multiplier 340 multiplies the signals a and y to generate the output a*y, and the slicer-side multiplier 342 multiplies the signals b and x to generate the output b*x. This multiplication function is equivalent to normalizing the energy levels of the core and slicer outputs 326 and 328 with respect to their amplitudes (x/a is the normalized core signal and y/b is the normalized slicer signal).

To determine the single-stage gain control signal (K) 330, the energy-level difference between the weighted signals (a*y and b*x) is measured by the adder 322. If the equalizer core 302 is multiple-stage, then the single-stage gain control signal (K) 330 is coupled to the sequencer 324, which generates the gain control signal (Ki) 303 that is fed back to the equalizer core 302 as described above. Alternatively, if the equalizer core 302 is single-stage, then the single-stage gain control signal is preferably fed back directly to the equalizer core 302. In either case, because the energy-level signals (x and y) corresponding to the lossy portions of the core and digital output signals 326 and 328 are normalized with respect to their low-frequency amplitudes (a and b), the values of K 330 and Ki 303 are made proportional to the transmission losses even though the amplitude of the equalizer input signal 332 is an unknown. In this manner, the gain control signal (Ki) 303 (or K 330) forces the normalized energy level of the core output (x/a) to approximate the normalized energy level of the slicer output (y/b), and the input signal 332 is correctly equalized.

Figure 12:
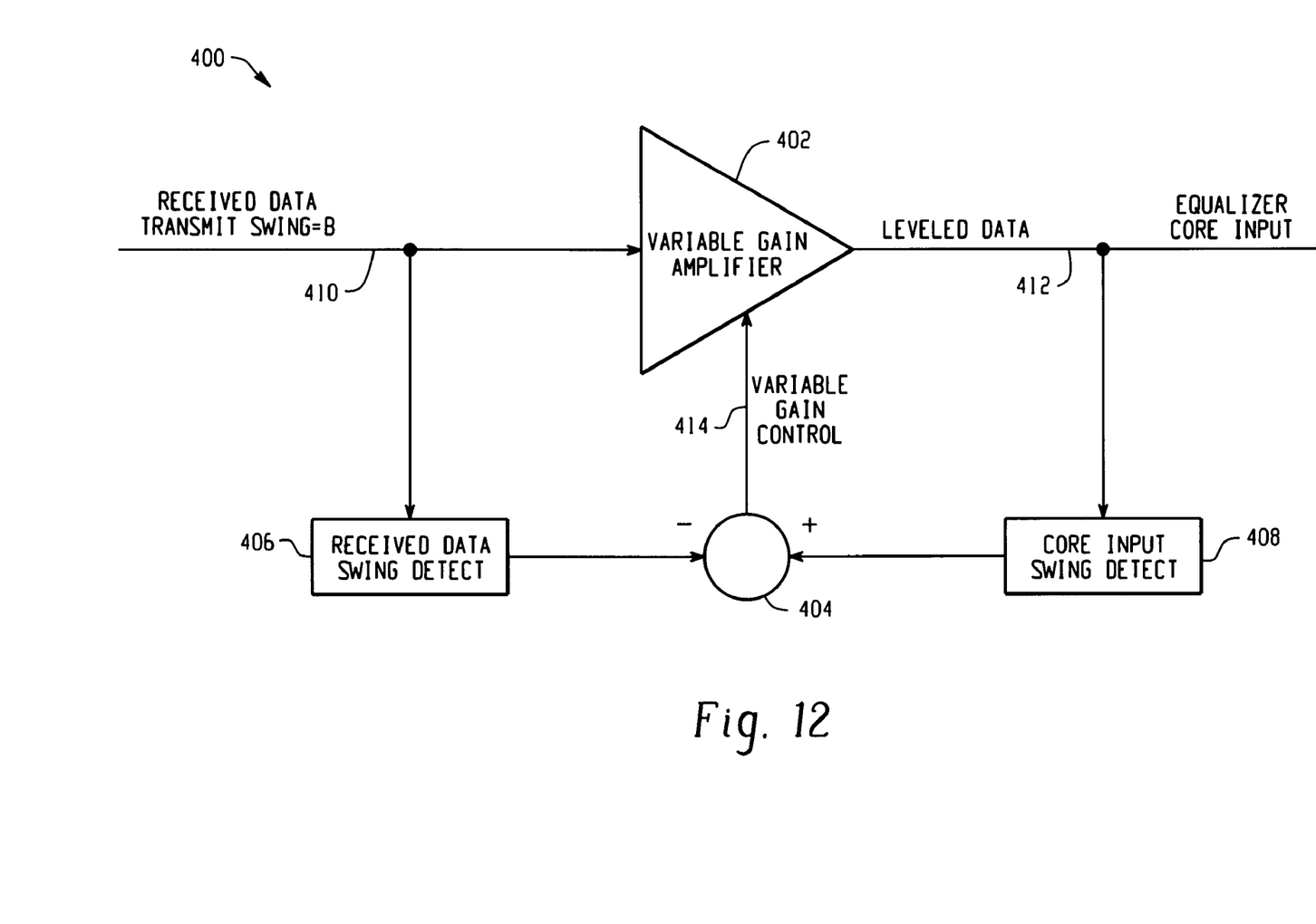
FIG. 12 is a block diagram of a transmit amplitude leveling circuit for an equalizer.

FIG. 12 is a block diagram of a transmit amplitude leveling circuit 400 for an equalizer. This circuit 400 includes a variable gain amplifier 402, an adder 404, a received data swing detection circuit 406, and a core input swing detection circuit 408. The variable gain amplifier 402 receives an input signal 410 from a transmission medium with an unknown transmit amplitude (B), and generates an equalizer core input signal 412 that settles to a fixed amplitude (A). The variable gain amplifier 402 also receives a variable gain control signal 414 that sets the gain of the amplifier 402 to either amplify or attenuate the input signal 410 to the fixed swing (A) expected by the equalizer core. The variable gain control signal 414 is preferably generated by the adder 404, which compares the transmit swing (B) of the input signal 410 from the transmission medium with the swing (A) of the equalizer core input signal 412. The transmit swing (B) of the input signal 410 is calculated with the received data swing detect circuit 406, which generates an energy-level output that is preferably coupled as a negative input to the adder 404. The swing (A) of the equalizer core input signal 412 is calculated with the core input swing detect circuit 408, which generates an energy-level output that is preferably coupled as a positive input to the adder 404. It should be understood, however, that many types of control circuits could be used to generate the variable gain control signal 414, such as a proportional type controller (P-Type), an integral type controller (I-Type) or a combination PI-type controller.

The transmit amplitude leveling circuit 400 may be implemented, for example, in the equalizer system 100 described above with reference to FIG. 9 by coupling the output of the variable gain amplifier 412 as the input to the equalizer core 102. For example, if the equalizer system 100 is configured to equalize data transmitted at 800 mV and the data is instead transmitted at 1200 mV, then the variable gain control signal 414 would preferably adjust the gain of the variable gain amplifier 402 to 0.666 in order to reduce the signal swing of the received data signal. If, however, the data is transmitted at 800 mV as expected in the equalizer core, then the gain of the variable gain control signal 414 would preferably be set to unity (1) by the variable gain control signal 414, and thus the amplifier 402 would be operating as a buffer.

Figure 13:
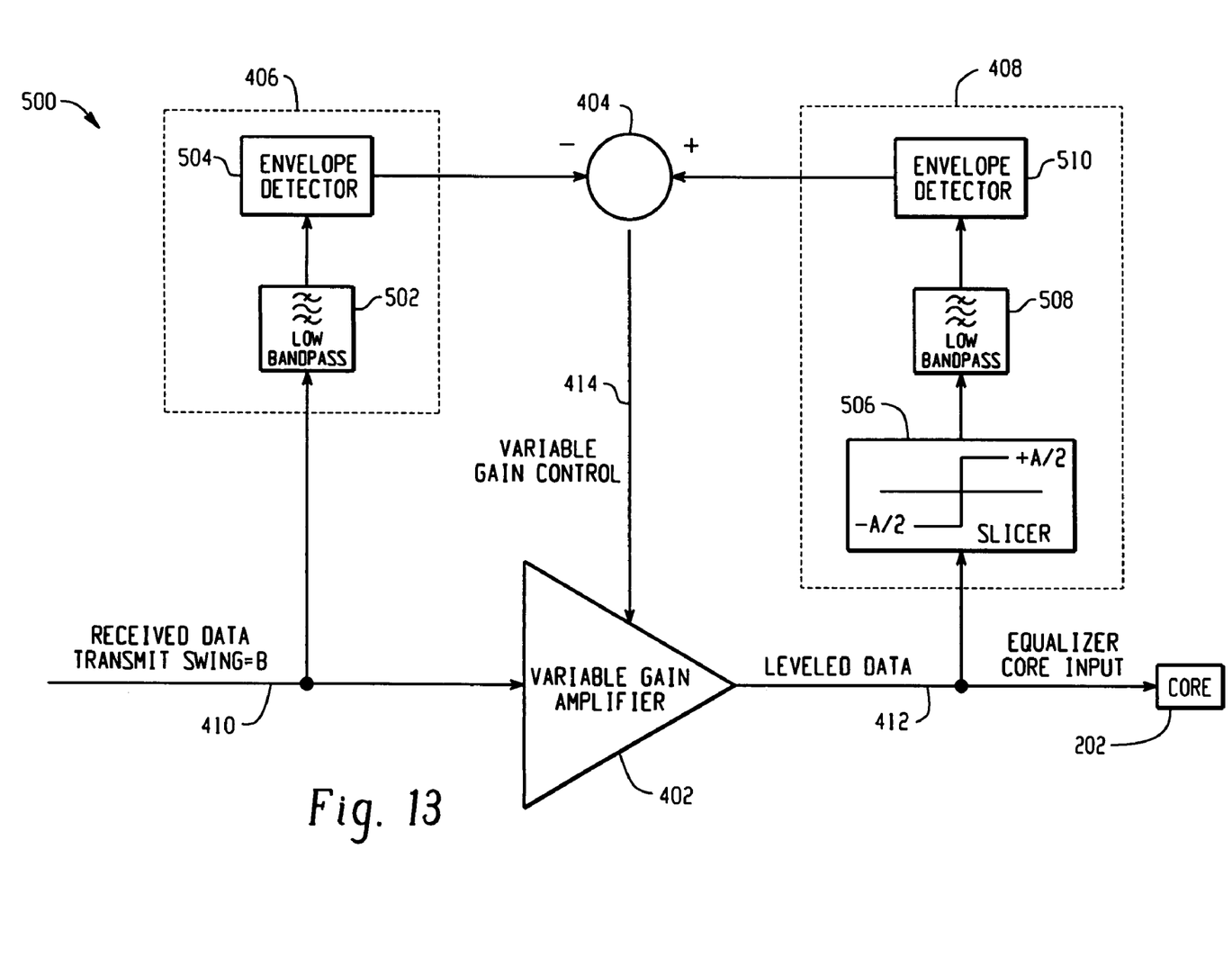
FIG. 13 is a block diagram illustrating an exemplary implementation of the received data swing detection circuit and the core input swing detection circuit shown in FIG. 12.

FIG. 13 is a block diagram illustrating an exemplary implementation of the received data swing detection circuit 406 and the core input swing detection circuit 408 shown in FIG. 12. The exemplary received data swing detection circuit 406 includes a low band-pass filter 502 and an envelope detector 504. The low band-pass filter 502 preferably filters the input signal 410 from the transmission medium to a frequency range centered towards the low end of the transmit spectrum at which the transmission losses are minimal. In this manner, the output from the low band-pass filter 502 approximates the transmit swing (B) of the input signal 410. The output from the low band-pass filter 502 is then coupled to the envelope detector 504, which detects the energy level of the signal and generates the output of the received data swing detection circuit.

The exemplary core input swing detection circuit 408 includes a fixed-swing slicer 506, a low band-pass filter 508, and an envelope detector 510. The fixed-swing slicer 506 is coupled to the equalizer core input signal 412, which is provided as input to the equalizer core 202 and is also converted by the slicer 506 into a digital output signal having the swing (A) expected in the equalizer core. This digital signal is then filtered by the low band-pass filter 508, which preferably has a bandwidth substantially the same as that of the low band-pass filter 502 in the received data swing detection circuit 406. The filtered output from the low band-pass filter 508 is coupled to the envelope detector 510, which detects the energy level of the signal and generates the output of the swing detection circuit 408. The output from the core input swing detection circuit 408 is preferably coupled as the positive input to the adder 404, and the output from the received data swing detection circuit 406 is preferably coupled as the negative input to the adder 404. The variable control signal 414 generated by the adder 404 is thus proportional to the difference between the transmit swing (B) of the input signal 410 and the swing (A) expected in the equalizer core 202.

Figure 14:
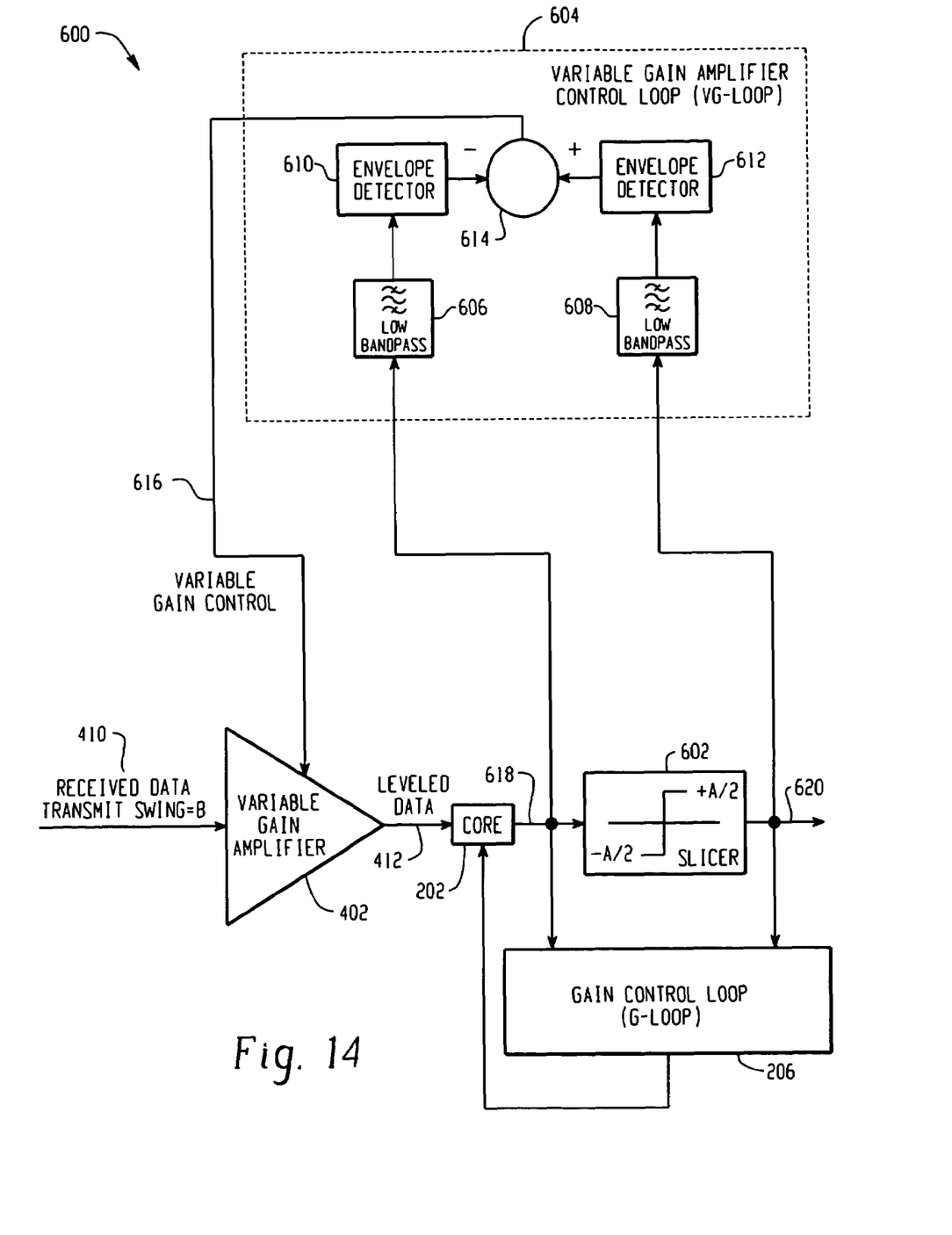
FIG. 14 is a block diagram of an exemplary transmit amplitude independent adaptive equalizer utilizing a variable gain amplifier.

FIG. 14 is a block diagram of an exemplary transmit amplitude independent adaptive equalizer 600 utilizing a variable gain amplifier 402. The equalizer 600 includes a variable gain amplifier 402, an equalizer core 202, a fixed-swing slicer 602, a gain control loop 206, and a variable gain amplifier control loop (VG-Loop) 604. The VG-Loop 604 includes two low band-pass filters 606 and 608, two envelope detectors 610 and 612, and an adder 614.

The variable gain amplifier 402 preferably receives an input signal 410 that has been attenuated from its transmit swing (B) as a result of losses incurred in a transmission medium. The variable gain amplifier 402 also receives a variable gain control signal 616 from the VG-Loop 604 that controls the amount of gain applied by the amplifier 402 in order to generate an equalizer core input 412 that settles to a fixed swing (A). The equalizer core 202 operates as described above to compensate for transmission losses incurred in the transmission medium, and generates a core output signal 618. The core output signal is then coupled to the fixed-swing slicer 602, which converts the core output signal 618 into a digital output signal 620 having a fixed swing (A). The gain control loop 206 operates as described above with reference to FIG. 10 to control the gain applied by the equalizer core 202 in order to compensate for frequency dependent losses incurred in the transmission medium. The VG-Loop 604 preferably isolates the low frequency portions of the core output signal 618 and the digital output signal 620, and compares the signal energies of the two low band-limited singles to generate the variable gain control signal 616. Preferably, the low band-limited signals are centered towards the low end of the transmit spectrum at which the losses from the transmission medium are minimal. However, the low band-limited signals may be centered at alternative points within the transmit spectrum as long as the VG-Loop 604 isolates a lower spectral range than the gain control loop 206.

Within the VG-Loop 604, the low frequency portions of the core output signal 618 and the digital output signal 620 are isolated by the low band-pass filters 606 and 608. The low band-limited signals are each coupled to one of the envelope detectors 610 and 612, which generate energy-level outputs that are proportional to the signal energies. The energy-level output from one envelop detector 612 is preferably coupled as a positive input to the adder 614, and the energy-level output from the other envelop detector 610 is preferably coupled as a negative input to the adder 614. The adder 614 generates the variable gain control signal 616, which is proportional to the difference between the energy levels of the low band-limited signals. In this manner, the variable gain control signal 616 forces the output of the variable gain amplifier to settle at a swing level (A) substantially equal to the fixed swing (A) of the slicer.

It should be understood that many types of controllers could be used to implement the VG-Loop 604 and the gain control loop 206 shown in FIG. 14. For instance, the VG-Loop 604 or the gain control loop 206 may be implemented as a proportional type controller (P-Type), an integral type controller (I-Type) or a combination proportional-integral type controller (PI-Type). In addition, the VG-Loop 604 and the gain control loop 206 are preferably implemented as different controller types in order to maintain stability in the system.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

We claim:

1. An equalizer, comprising:
    a variable gain amplifier coupled to an input signal from a transmission medium and a variable gain control signal that applies a variable gain to the input signal to generate an equalizer core input signal having a pre-determined, fixed signal swing;
    a variable gain amplifier control loop coupled to the input signal and the equalizer core input signal that compares the input signal with the equalizer core input signal and generates the variable gain control signal; and
    an equalizer core coupled to the equalizer core input signal that applies a frequency dependant gain to the equalizer core input signal to compensate for attenuation of the input signal caused by losses incurred in the transmission medium;
    wherein the variable gain amplifier control loop comprises:
    a first filter coupled to the input signal that filters the input signal to a frequency range at which the input signal incurs minimal attenuation from the transmission medium and generates a first low-frequency signal;
    a fixed-swing slicer coupled to the equalizer core input signal that converts the equalizer core input signal into a digital signal having the pre-determined, fixed signal swing; and
    a second filter coupled to the digital signal that filters the digital signal to the frequency range at which the input signal incurs minimal attenuation from the transmission medium and generates a second low-frequency signal;
    wherein the first and second low-frequency signals are processed to generate the variable gain control signal.

2. The equalizer of claim 1, wherein the variable gain amplifier control loop comprises:
    a received data swing control detect circuit coupled to the input signal that detects a first energy level in the input signal and generates a first energy-level output; and
    a core input swing detect circuit coupled to the equalizer core input signal that detects a second energy level in the equalizer core input signal and generates a second energy-level output;
    wherein the first and second energy-level outputs are compared by the variable gain amplifier control loop to generate the variable gain control signal.

3. The equalizer of claim 2, wherein the variable gain amplifier control loop further comprises:
    an adder coupled to the first and second energy-level outputs that generates the variable gain control signal.

4. The equalizer of claim 1, wherein the variable gain amplifier control loop further comprises:
    a plurality of envelope detectors that determine energy levels in the first and second low-frequency signals, wherein the energy levels in the first and second low-frequency signals are compared to generate the variable gain control signal.

5. An equalization method, comprising:

applying a variable gain to an input signal received from a transmission medium to generate an equalizer core input signal having a pre-determined, fixed swing;

comparing the input signal with the equalizer core input signal by: (i) filtering the input signal to a frequency range at which the input signal incurs minimal attenuation from the transmission medium and generates a first low-frequency signal; (ii) converting the equalizer core input signal into a digital signal having the pre-determined, fixed swing; (iii) filtering the digital signal to the frequency range at which the input signal incurs minimal attenuation from the transmission medium and generates a second low-frequency signal; and (iv) processing the first and second low-frequency signals to generate a variable gain control signal;

adjusting the variable gain based on the variable am control signal; and applying a frequency dependant gain to the equalizer core input signal to compensate for attenuation of the input signal caused by losses incurred in the transmission medium.

6. The method of claim 5, wherein the comparing the input signal with the equalizer core input signal comprises:

detecting a first energy level in the input signal and generating a first energy level output;

detecting a second energy level in the equalizer core input signal and generating a second energy level output; and comparing the first and second energy level output signals to generate the variable gain control signal.

7. The method of claim 5, wherein the comparing the input signal with the equalizer core input signal comprises:

envelope detecting to determine energy levels in the first and second low-frequency signals.

8. An equalizer, comprising:

means for applying a variable gain to an input signal received from a transmission medium to generate an equalizer core input signal having a pre-determined, fixed swing;

means for comparing the input signal with the equalizer core input signal by (i) filtering the input signal and generating a first low-frequency signal; (ii) converting the equalizer core input signal into a digital signal having the pre-determined, fixed swing; (iii) filtering the digital signal and generating a second low-frequency signal; and (iv) processing the first and second low-frequency signals to generate a variable gain control signal;

means for adjusting the variable gain based on the variable gain control signal; and means for applying a frequency dependant gain to the equalizer core input signal to compensate for attenuation of the input signal caused by losses incurred in the transmission medium.

9. The equalizer of claim 8, wherein the means for comparing comprises:

means for detecting a first energy level in the input signal and generating a first energy level output;

means for detecting a second energy level in the equalizer core input signal and generating a second energy level output; and means for comparing the first and second energy level output signal to generate the variable gain control signal.

10. An equalizer processing device, comprising:

a variable gain amplifier coupled to an input signal from a transmission medium and a variable gain control signal that applies a variable gain to the input signal to generate an equalizer core input signal having a pre-determined, fixed signal swing;

a first signal processing circuit that receives the input signal and generates a first control signal;

a second signal processing circuit that receives the equalizer core input signal and generates a second control signal, the second signal processing circuit comprising a slicer configured to receive the equalizer core input signal and generate a sliced signal; a bandpass filter configured to receive the sliced signal and bandpass filter the sliced signal to generate a bandpass filtered sliced signal; and an envelope detector configured to receive the bandpass filtered sliced signal and generate the second control signal; and a third signal processing circuit that receives the first and second control signals and generates the variable gain control signal from the first and second control signals.

11. The equalizer processing device of claim 10, further comprising:

an equalizer core coupled to the equalizer core input signal that applies a frequency dependant gain to the equalizer core input signal to compensate for attenuation of the input signal caused by losses incurred in the transmission medium.

12. The equalizer processing device of claim 10, wherein the first signal processing circuitry comprises:

a bandpass filter configured to receive the input signal and bandpass filter the input signal to generate a bandpass filtered input signal; and an envelope detector configured to receive the bandpass filtered input signal and generate the first control signal.

13. The equalizer processing device of claim 10, wherein the third signal processing circuitry comprises:

a summing circuit configured to receive the first and second control signals and generate the variable gain control signal.

* * * * *